US009542423B2

(12) United States Patent
Wolf et al.

(10) Patent No.: US 9,542,423 B2
(45) Date of Patent: Jan. 10, 2017

(54) BACKUP USER INTERFACE

(71) Applicant: Apple Inc., Cupertino, CA (US)

(72) Inventors: Christopher Wolf, Raleigh, NC (US); Daniel I. Feldman, Cupertino, CA (US); Eric A. Weiss, Paris (FR); Kristen A. McIntyre, Fremont, CA (US); Pavel Cisler, Los Gatos, CA (US); Richard B. Blair, San Jose, CA (US); Erika Misaki, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 223 days.

(21) Appl. No.: 13/839,358

(22) Filed: Mar. 15, 2013

(65) Prior Publication Data

US 2014/0188808 A1    Jul. 3, 2014

Related U.S. Application Data

(60) Provisional application No. 61/748,001, filed on Dec. 31, 2012.

(51) Int. Cl.
*G06F 17/30* (2006.01)
*G06F 11/14* (2006.01)
*G06F 11/32* (2006.01)

(52) U.S. Cl.
CPC ..... *G06F 17/30289* (2013.01); *G06F 11/1451* (2013.01); *G06F 11/1458* (2013.01);
(Continued)

(58) Field of Classification Search
USPC ................. 707/654, 662–663, 666
See application file for complete search history.

(56) References Cited

U.S. PATENT DOCUMENTS

| 5,241,668 | A | 8/1993 | Eastridge et al. |
| 5,737,557 | A | 4/1998 | Sullivan |
| 6,061,409 | A | 5/2000 | Moriya |
| 6,141,771 | A | 10/2000 | O'Brien et al. |
| 6,247,126 | B1 | 6/2001 | Beelitz et al. |
| 6,301,675 | B1 | 10/2001 | Andrews |
| 6,513,051 | B1 * | 1/2003 | Bolosky .............. G06F 11/1453 |
| 6,611,850 | B1 | 8/2003 | Shen |

(Continued)

FOREIGN PATENT DOCUMENTS

| CN | 1262480 | 8/2000 |
| CN | 1658195 | 8/2005 |

(Continued)

OTHER PUBLICATIONS

Authorized officer Anita Rothenbücher, International Search Report and Written Opinion in PCT/US2012/039007, mailed Oct. 24, 2012, 16 pages.

(Continued)

*Primary Examiner* — Hanh Thai
(74) *Attorney, Agent, or Firm* — Fish & Richardson P.C.

(57) ABSTRACT

Methods, systems, and apparatus, including computer programs encoded on a computer storage medium, for storing data are disclosed. In some implementations, visual representations of files are generated for presentation in a backup user interface. The visual representations are generated from sparse file system metadata stored on the computing device, thus allowing faster navigating of the backup user interface. During a restore operation, the metadata can be used to retrieve the items from their physical storage locations. In some implementations, when the storage capacity of a backup storage device exceeds a threshold, the data for the N oldest backups are replaced with sparse file system metadata, which can be used to generate visual representations for presentation in the backup user interface.

22 Claims, 14 Drawing Sheets

(52) U.S. Cl.
CPC ...... *G06F 11/1469* (2013.01); *G06F 17/3007* (2013.01); *G06F 11/323* (2013.01); *G06F 2201/815* (2013.01)

(56) References Cited

U.S. PATENT DOCUMENTS

| | | | |
|---|---|---|---|
| 6,851,073 B1 | 2/2005 | Cabrera et al. | |
| 7,062,543 B2 | 6/2006 | Kishimoto | |
| 7,124,323 B2 | 10/2006 | Sanchez et al. | |
| 7,237,075 B2 | 6/2007 | Welsh et al. | |
| 7,330,997 B1 | 2/2008 | Odom | |
| 7,418,619 B1* | 8/2008 | Uhlmann | G06F 11/1451 714/2 |
| 7,437,388 B1 | 10/2008 | DeVos | |
| 7,505,762 B2* | 3/2009 | Onyon | H04W 8/205 455/418 |
| 7,509,524 B2 | 3/2009 | Patel et al. | |
| 7,584,226 B2 | 9/2009 | Fatula, Jr. et al. | |
| 7,590,668 B2 | 9/2009 | Kathuria et al. | |
| 7,647,462 B2 | 1/2010 | Nolfgang et al. | |
| 7,660,831 B2 | 2/2010 | Freedman | |
| 7,711,771 B2 | 5/2010 | Kirnos | |
| 7,720,818 B1 | 5/2010 | Laura | |
| 7,721,138 B1 | 5/2010 | Lyadvinsky et al. | |
| 7,725,704 B1 | 5/2010 | Beaverson et al. | |
| 7,734,578 B2 | 6/2010 | Prahlad et al. | |
| 7,743,028 B1* | 6/2010 | Stringham et al. | 707/646 |
| 7,747,577 B2 | 6/2010 | Cannon et al. | |
| 7,853,566 B2* | 12/2010 | Cisler et al. | 707/654 |
| 7,860,839 B2* | 12/2010 | Cisler et al. | 707/654 |
| 7,870,093 B2 | 1/2011 | Eguchi et al. | |
| 7,925,622 B2 | 4/2011 | Chapman | |
| 8,042,172 B1 | 10/2011 | Heithcock et al. | |
| 8,103,632 B2 | 1/2012 | Schmidt et al. | |
| 8,180,735 B2 | 5/2012 | Ansari et al. | |
| 8,224,857 B2 | 7/2012 | Doganata et al. | |
| 8,255,731 B1 | 8/2012 | Alsina et al. | |
| 8,339,105 B2 | 12/2012 | Maleyran et al. | |
| 8,341,127 B1 | 12/2012 | Heithcock et al. | |
| 8,487,583 B2 | 7/2013 | Nokkonen et al. | |
| 8,566,289 B2* | 10/2013 | Paterson et al. | 707/654 |
| 8,600,947 B1* | 12/2013 | Freiheit | G06F 11/1458 707/634 |
| 8,713,265 B1 | 4/2014 | Rutledge | |
| 8,745,523 B2* | 6/2014 | McInerney | 715/764 |
| 8,806,281 B1* | 8/2014 | Dowers, II | G06F 11/328 714/46 |
| 8,984,029 B2 | 3/2015 | Giampaolo et al. | |
| 2002/0087590 A1 | 7/2002 | Bacon et al. | |
| 2002/0091956 A1 | 7/2002 | Potter et al. | |
| 2003/0014521 A1 | 1/2003 | Elson et al. | |
| 2003/0028736 A1* | 2/2003 | Berkowitz | G06F 11/1451 711/162 |
| 2004/0236958 A1 | 11/2004 | Teicher et al. | |
| 2005/0137983 A1 | 6/2005 | Bells | |
| 2005/0165820 A1 | 7/2005 | Pudipeddi et al. | |
| 2005/0170827 A1 | 8/2005 | Nagashima | |
| 2005/0188165 A1 | 8/2005 | Wolfgang et al. | |
| 2005/0210304 A1 | 9/2005 | Hartung et al. | |
| 2005/0216788 A1 | 9/2005 | Mani-Meitav et al. | |
| 2005/0216911 A1 | 9/2005 | Yen et al. | |
| 2005/0273476 A1 | 12/2005 | Wertheimer et al. | |
| 2005/0289381 A1 | 12/2005 | Yeo | |
| 2006/0129496 A1 | 6/2006 | Chow et al. | |
| 2006/0168351 A1 | 7/2006 | Ng et al. | |
| 2006/0200754 A1 | 9/2006 | Kablesh et al. | |
| 2006/0206547 A1 | 9/2006 | Kulkarni et al. | |
| 2007/0005669 A1 | 1/2007 | Mueller et al. | |
| 2007/0016825 A1 | 1/2007 | Tarcea et al. | |
| 2007/0033252 A1 | 2/2007 | Combest | |
| 2007/0088764 A1 | 4/2007 | Yoon et al. | |
| 2007/0088973 A1* | 4/2007 | Passerini et al. | 714/5 |
| 2007/0136389 A1 | 6/2007 | Bergant et al. | |
| 2007/0136423 A1 | 6/2007 | Gilmore et al. | |
| 2007/0150326 A1 | 6/2007 | Nakao et al. | |
| 2007/0156925 A1 | 7/2007 | Shigeta et al. | |
| 2007/0196099 A1 | 8/2007 | Ishiyama et al. | |
| 2007/0198789 A1* | 8/2007 | Clark | G06F 11/1448 711/162 |
| 2007/0204003 A1 | 8/2007 | Abramson | |
| 2007/0226730 A1 | 9/2007 | Coyle et al. | |
| 2007/0245105 A1 | 10/2007 | Suzuki et al. | |
| 2007/0250671 A1* | 10/2007 | Lyon | 711/162 |
| 2007/0260759 A1 | 11/2007 | Scott, II | |
| 2007/0266007 A1* | 11/2007 | Arrouye et al. | 707/3 |
| 2007/0294321 A1 | 12/2007 | Midgley et al. | |
| 2007/0294546 A1 | 12/2007 | Lee | |
| 2008/0034307 A1* | 2/2008 | Cisler | G06F 9/4443 715/764 |
| 2008/0065637 A1 | 3/2008 | Farlee et al. | |
| 2008/0104145 A1 | 5/2008 | Lipman et al. | |
| 2008/0126445 A1 | 5/2008 | Michelman | |
| 2008/0133622 A1 | 6/2008 | Brown et al. | |
| 2008/0140963 A1 | 6/2008 | Thomason et al. | |
| 2008/0155223 A1 | 6/2008 | Hiltgen et al. | |
| 2008/0189298 A1 | 8/2008 | Cha | |
| 2008/0201343 A1 | 8/2008 | Crescenti et al. | |
| 2008/0250400 A1 | 10/2008 | Vertes | |
| 2008/0307000 A1* | 12/2008 | Paterson | G06F 11/1458 |
| 2008/0307019 A1 | 12/2008 | Weiss et al. | |
| 2008/0307333 A1* | 12/2008 | McInerney et al. | 715/764 |
| 2008/0307345 A1* | 12/2008 | Hart | G06F 11/1448 715/769 |
| 2008/0307347 A1* | 12/2008 | Cisler | G06F 11/1458 715/771 |
| 2008/0307348 A1 | 12/2008 | Jones et al. | |
| 2009/0063419 A1 | 3/2009 | Nurminen et al. | |
| 2009/0089537 A1 | 4/2009 | Vick et al. | |
| 2009/0116641 A1 | 5/2009 | Bokor et al. | |
| 2009/0144341 A1 | 6/2009 | Hauck et al. | |
| 2009/0249119 A1 | 10/2009 | Sethumadhavan et al. | |
| 2009/0254572 A1 | 10/2009 | Redlich et al. | |
| 2009/0307333 A1 | 12/2009 | Welingkar et al. | |
| 2009/0307683 A1 | 12/2009 | Gharabally | |
| 2010/0031248 A1 | 2/2010 | Sonkin et al. | |
| 2010/0052620 A1 | 3/2010 | Wong | |
| 2010/0057789 A1 | 3/2010 | Kawaguchi | |
| 2010/0095077 A1 | 4/2010 | Lockwood | |
| 2010/0125712 A1* | 5/2010 | Murase | G06F 11/1458 711/162 |
| 2010/0262796 A1* | 10/2010 | Camborde | 711/162 |
| 2010/0275110 A1 | 10/2010 | Frid-Nielsen et al. | |
| 2010/0293329 A1 | 11/2010 | Wang | |
| 2010/0313069 A1 | 12/2010 | Murata | |
| 2010/0332401 A1 | 12/2010 | Prahlad et al. | |
| 2010/0332818 A1 | 12/2010 | Prahlad et al. | |
| 2011/0026328 A1 | 2/2011 | Moshayedi | |
| 2011/0082837 A1* | 4/2011 | Cherkasova et al. | 707/654 |
| 2011/0082972 A1* | 4/2011 | Cherkasova et al. | 711/111 |
| 2011/0125717 A1 | 5/2011 | Manson | |
| 2011/0246427 A1 | 10/2011 | Modak et al. | |
| 2011/0306326 A1 | 12/2011 | Reed et al. | |
| 2012/0066612 A1 | 3/2012 | Virmani et al. | |
| 2012/0084261 A1 | 4/2012 | Parab | |
| 2012/0102279 A1 | 4/2012 | Coronado et al. | |
| 2012/0110287 A1 | 5/2012 | Han et al. | |
| 2012/0185438 A1 | 7/2012 | Giampaolo et al. | |
| 2012/0185518 A1 | 7/2012 | Giampaolo et al. | |
| 2012/0185521 A1 | 7/2012 | Giampaolo et al. | |
| 2012/0310889 A1 | 12/2012 | McNeil et al. | |
| 2012/0310894 A1 | 12/2012 | Freedman et al. | |
| 2012/0311366 A1 | 12/2012 | Alsina et al. | |
| 2013/0073821 A1 | 3/2013 | Flynn et al. | |
| 2013/0138609 A1 | 5/2013 | Schleifer et al. | |

FOREIGN PATENT DOCUMENTS

| | | |
|---|---|---|
| CN | 1661563 | 8/2005 |
| CN | 1846197 | 10/2006 |
| CN | 101578580 | 11/2009 |
| CN | 101741601 | 6/2010 |
| CN | 1015/66959 | 10/2013 |
| EP | 1455275 | 9/2004 |

(56) References Cited

FOREIGN PATENT DOCUMENTS

| | | |
|---|---|---|
| EP | 2073461 | 6/2009 |
| JP | 2001/147784 | 5/2001 |
| JP | 2003/347988 | 12/2003 |
| JP | 2008/181287 | 8/2008 |
| JP | 2009/238227 | 10/2009 |
| JP | 2010/282468 | 12/2010 |
| TW | 201118556 | 6/2011 |
| WO | WO 01/42922 | 6/2001 |
| WO | WO 2011/053450 | 5/2011 |

OTHER PUBLICATIONS

Authorized officer Anita Rothenbûcher, International Search Report and Written Opinion in PCT/US2012/039013, mailed May 22, 2012, 11 pages.

Authorized officer Bogdan Gavriliu, International Search Report in PCT/US2012/039009, mailed Dec. 6, 2012, 4 pages.

SathiyaMoorthy ("Lin ix Crontab: 15 Awesome Cron Job Example", Jun. 11, 2009), 6 pages.

Shi et al., "USP: A Lightweight File System Management Framework," 2010 Fifth IEEE International Conference on Networking, Architecture, and Storage, 2010 IEEE, pp. 250-256.

International Search Report in International Application No. PCT/US2013/074769, mailed Jan. 13, 2015, 4 pages.

Invitation to Pay Additional Fees and Where Applicable, Protest Fee in International Application No. PCT/US2013/074769, 5 pages.

Chinese Application for Invention No. 201280027224.0—First Office Action dated Sep. 14, 2015, 10 pages (With English translation).

International Search Report and Written Opinion in application No. PCT/US2012/039013, dated Aug. 8, 2012, 9 pages.

Chinese Application for Invention No. 201280027180.1—First Office Action dated Feb. 24, 2016, 22 pages (With English translation).

Chinese Application for Invention No. 201280027326.2—First Office Action dated Feb. 3, 2016, 10 pages (With English translation).

\* cited by examiner

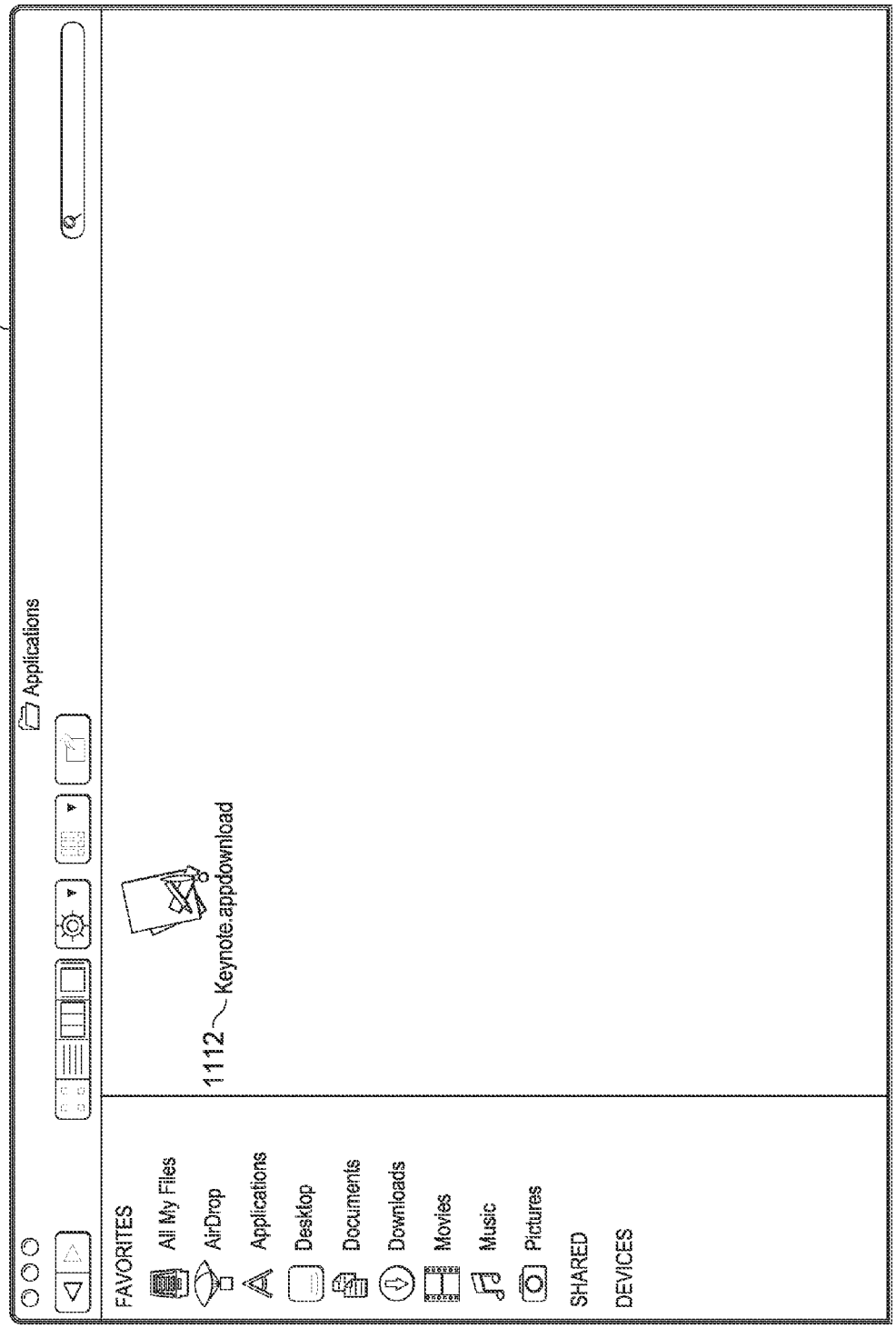

BACKUP USER INTERFACE

CROSS-REFERENCE TO RELATED APPLICATION

This application claims priority to U.S. Provisional Application No. 61/748,001, entitled "Backup User Interface," filed on Dec. 31, 2012, the entire contents of which are incorporated herein by reference.

TECHNICAL FIELD

This disclosure is related generally to backup and restore of data on a computing device.

BACKGROUND

Users can conventionally store data as part of one or more backups (e.g., of a file system or specified files or folders) to one or more external locations. If there is a failure to a user device, particular backup versions of data can be recovered. Typically, the data can only be viewed and recovered when the user device is connected to the corresponding external location having the backup data.

SUMMARY

Methods, systems, and apparatus, including computer programs encoded on a computer storage medium, for storing data are disclosed.

In some implementations, visual representations of files are generated for presentation in a backup user interface. The visual representations are generated from sparse file system metadata stored on the computing device, thus allowing faster navigating of the backup user interface. During a restore operation, the metadata can be used to retrieve the items from their physical storage locations.

In some implementations, when the storage capacity of a backup storage device exceeds a threshold, the data for the N oldest backups are replaced with sparse file system metadata, which can be used to generate visual representations for presentation in the backup user interface.

In some implementations, a method of restoring backup data on a computing device can include receiving a request to restore an item from a backup, determining that the item was previously purchased or downloaded from an online store, and retrieving a copy of the item from the online store using information related to the purchase or download of the item.

In some implementations, a method of managing backups on a computing device can include determining that a backup storage device is low on capacity, identifying N oldest backups, where N is a positive integer greater or equal to one, removing file data for files in the N oldest backups from the backup storage device, replacing the removed file data with metadata, and generating visual representations of the files in one or more backup user interfaces using the metadata.

Particular implementations of the subject matter described in this specification can be implemented so as to realize one or more of the following advantages. A backup user interface can be presented on a computing device that allows a user to view visual representations of a virtual file system as if it were the actual file system at times in the past. Data for items in the backup purchased and/or downloaded from an online store can be restored to the computing device from the online store, saving storage space on the computing device. File data for older backups can be replaced by metadata that can be used to generate visual representations of the files in the backup user interface, saving even more storage space on the computing device.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

FIGS. 11A-11D are screen shots illustrating a virtual file system and the use of sparse file system metadata to generate visual representations of files in a backup user interface.

The same reference symbol used in various drawings indicates like elements.

DETAILED DESCRIPTION

Backups of file system data can be made even when a user device is not coupled to an external storage device. In particular, a virtual file system can be generated that provides a compact representation of the file system during an epoch in order to generate a locally stored backup at the end of each epoch. An epoch is a specified period of time between each backup. The backups can be generated as snapshots of the file system for that epoch. The virtual file system is generated as versions of data items are added for inclusion in the backup. While the hierarchical file system of the actual file system is mimicked, directories above a given version being stored in the backup can be faults (e.g., zero data items). Additionally, the virtual file system can only include the portions of the file system in which changes have occurred, reducing storage space needed for a given backup. The data items added for inclusion in the backup can be copies of files captured prior to deletion or modification. Additionally, or alternatively, the data items can be markers indicating the type of change to the data item (e.g., a marker indicating a file has been deleted, modified, or moved).

Visual representations of each backup can be generated and presented in a backup interface. The visual representations present the backup file system data as it occurred at that point in time. In particular, the visual representation can be presented as a visual representation of a file system window corresponding to an actual file system window previously being presented except that the contents of the file system window correspond to the data present at the time of the backup operation. A user can interact with the visual representation. For example, a user can select one or more data items presented in the visual representation for restoration to the current file system. A user can also provide input to present a visual representation of a different (e.g., an earlier) backup.

Figure 1:
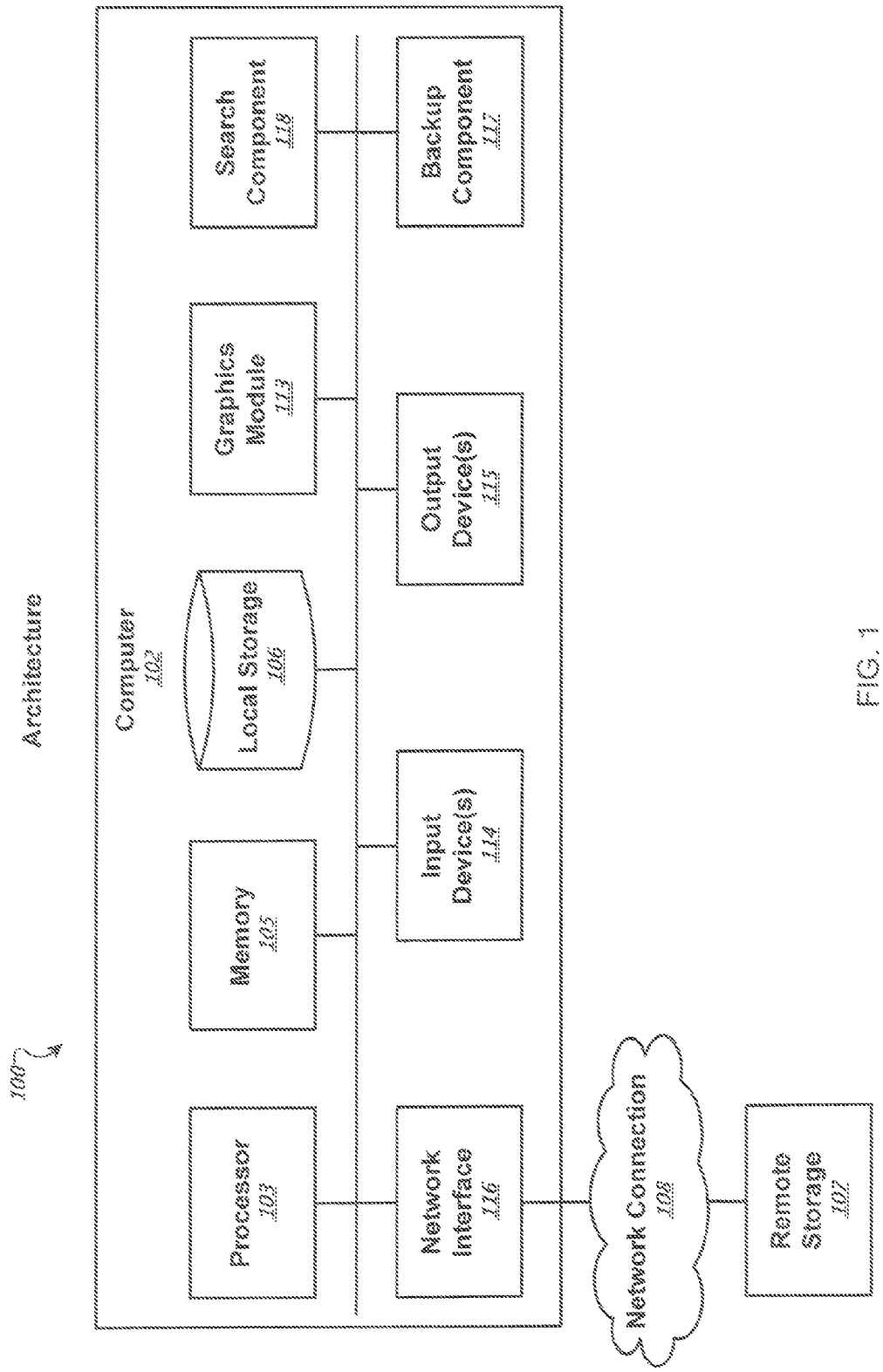
FIG. 1 is a block diagram of an example system.

FIG. 1 is a block diagram of an example system 100. The system 100 can allow a user to generate, view, navigate, and restore data, for example, in either remote backup storage or local backups. The system 100 can further provide visual representations of locally stored backup data as part of a virtual file system. The visual representation can correspond to a visual representation of a user interface window, for example, of a user interface window providing various file system information including, for example, icons, files, folders, or other data. The visual representation can be presented in a particular backup interface. However, rather than presenting a simple image of the user interface window, a user can interact with the visual representation to navigate through a hierarchy of windows or to select one or more individual data items presented within the visual representation. Various types of data items from a file system can be subjected to a backup operation by a backup component 117, e.g., files, folders, system settings, metadata, state information, etc.

The system 100 includes a computing device 102 (e.g., a personal computer such as a desktop or notebook computer, a tablet device, a mobile device, etc.) communicatively coupled to a remote storage 107 through a network interface 116 and a network 108 (e.g., local area network, wide area network, wireless network, Internet, intranet, etc.). The computing device 102 generally includes a processor 103, a memory 105, one or more input devices 114 (e.g., keyboard, mouse, etc.), and one or more output devices 115 (e.g., a display device). A user interacts with the system 100, for example, using the input and output devices 114, 115. The system 100 includes various hardware elements. The system 100 can include hardware, software, and combinations of the two.

The computing device 102 also includes a local storage device 106 and a graphics module 113 (e.g., a graphics processing unit or GPU) for storing information and generating graphical objects, respectively. The local storage device 106 can be used to store backup data as part of a virtual file system. In some implementations, backup data is stored locally only when the computing device 102 is not connected to the remote storage 107.

Though discussion is made with reference representations of user interfaces, theses visual representations can be based on various data structures, files, processes, and other aspects of information management. Modification to file structures, data and the like is also contemplated to achieve various interactions and displays of the visual representation.

The computing device 102 includes the backup component 117 that allows for the storage of versions of file system data (e.g., files or other items), for example within the local storage 106 or in an external storage repository (e.g., remote storage 107) as part of a backup operation. In some implementations, the backup component 117 also allows a user to select any of the stored versions and use it to initiate a restoration of backup data corresponding to that version in the computing device 102 (e.g., a restoration of a file to the current file system). In some implementations, separate backup components 117 are used for local backups and external backups.

In some implementations, the computing device 102 includes a search component 118 that allows for searches of the computer's files or other items, for example within the local storage 106 or an external storage repository. This can include searching locally stored backup information within the virtual file system. In some implementations, the search component 118 can interact with the backup component 117 to perform searches of stored versions of files or other items on the computing device 102. Particularly, in one implementation, the search component 118 provides that a user can select search results identified in an earlier version and use them to initiate a restoration of that version in the computing device 102.

In some implementations, when a user searches for a file but the file is not found, the user can invoke the backup component 117 (or a portion thereof) to show one or more previous backup states corresponding to, for example, the various locations within a hierarchical file system for a specific earlier point in time. For example, if the user is looking for content of the C: drive (that does not currently hold the sought file), the user (or the computer) can launch a backup component to present visual representations of previous states of the C: drive to see if the file has been included in a backup (either locally or, if connected, on a remote storage device). This operation can be facilitated by the search environment forwarding information (e.g., an identity of the sought file) to the backup environment for showing the correct archive(s).

Figure 2:
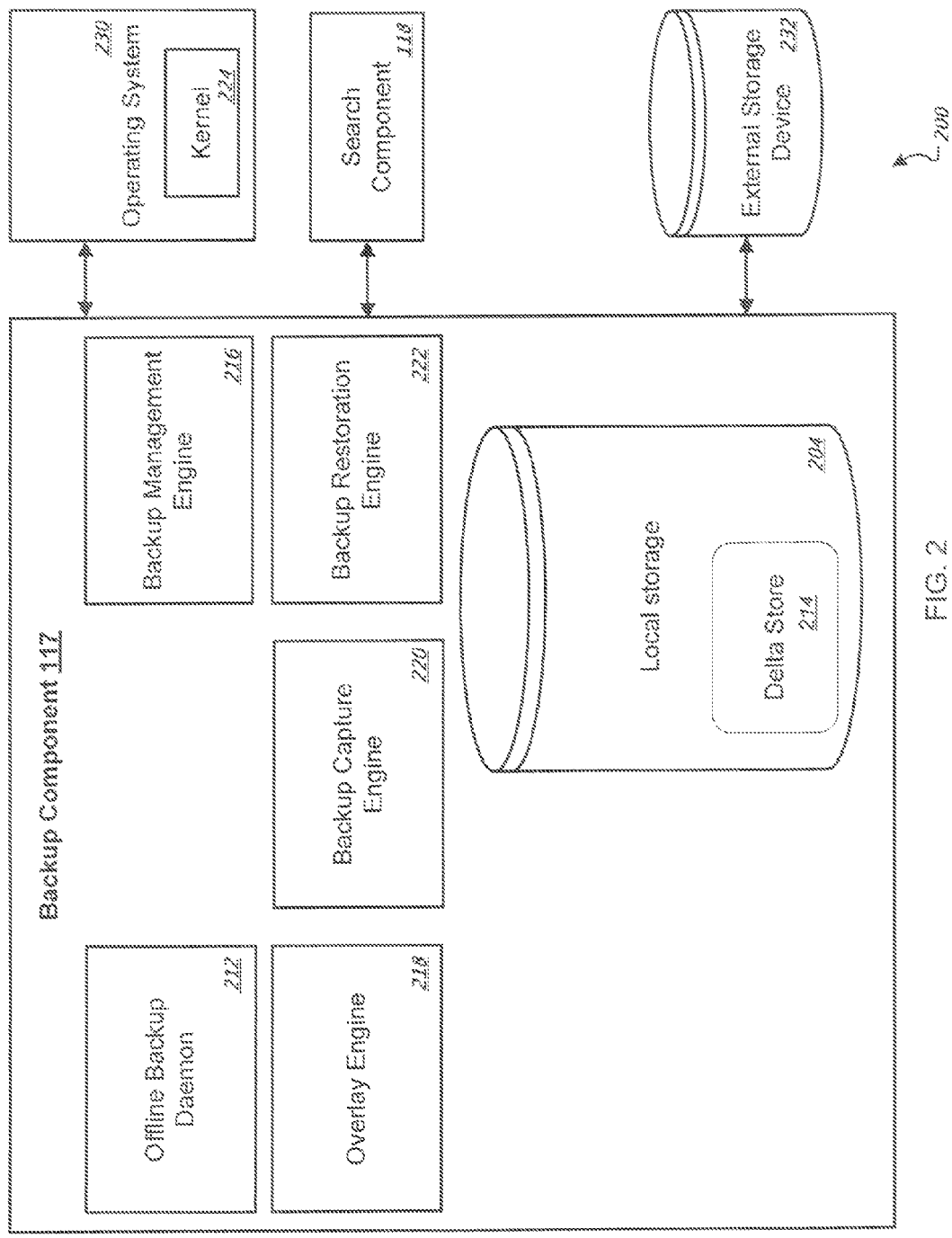
FIG. 2 is a block diagram of an example architecture for the local backup and restoration of data.

FIG. 2 is a block diagram of an example architecture 200 for the local backup and restoration of data. The data can include, e.g., files such as application files or system files, application data, settings, parameters etc. The backup component 117 provides backup and restoration capability for the system. Many different items or elements can be the subject of a backup operation in the system. For example, folders, files, items, information portions, directories, images, system parameters, playlists, address books, e-mails, e-mail folders, a state of an application or state of the system, preferences (e.g., user or system preferences), etc. all can be included in one or more backup operations.

In this example, the backup component 117 includes a local storage device 204 and an external storage device 232. Backup data can be stored on either. In particular, backups can be periodically stored on the external storage device 232 according to particular backup criteria (e.g., as defined by a backup application or a user). Additionally, particular backup data can be stored on the local storage device 204. Specifically, in some implementations, a delta store 214 can be used to store local backups temporarily when the user's device is not connected to the external storage device 232. The delta store 214 can be used to generate a virtual file system, e.g., based on an encoded representation of the file system stored in the delta store. In particular, the encoded representation of the file system can encode a particular file system state and include incremental changes to data items, e.g., changed data for particular files, added files, deleted files, or moved files. In some implementations, the virtual file system provides a read-only synthetic representation of how the backup of the file system would appear as a full file system backup instead of including just the changes to the file system. The virtual file system can be generated on the fly from the delta store's encoded representation in order to provide a visual representation of the backup, as described in greater detail below.

Once the connection to the external storage device 232 has been reestablished, the temporary backup data can be converted into one or more backups on the external storage device 232 using a migration process.

Various numbers of local and/or external storage devices can be used by the backup component 117 for storing backup data corresponding to the versions. In some implementations, the backup component 117 stores the backup data in a format corresponding to a file system structure. However, storage on the local storage device 204 can be a reduced representation of the file system hierarchy. In particular, the local storage device 204 can include the delta store 214, in which incremental changes to data for the virtual file system representations for various local backups are stored.

In some implementations, the backup component 117 runs as a background task on an operating system 230, where the task is generally not visible to the user. In particular, the backup component can operate in coordination with a kernel 224 of the operating system in order to identify triggering events for backup operations. For example, a particular triggering event can be a type of file operation, e.g., an incoming write call for a modification to a file. In response to the trigger, the kernel can facilitate a copy of the unmodified version of the file being stored in the local storage prior to allowing the file operation to proceed. The backup component 117 can be configured to run across multiple user accounts.

A backup management engine 216 coordinates the collection, storage, and retrieval of backups performed by the backup component 117. For example, the backup management engine 216 can manage the triggering events for storing data, the frequency of performing backups, as well as determine whether a backup is to be performed on the external storage device 232 or whether a local backup is to be generated.

A backup capture engine 220 stores data to the local storage 204 identified for inclusion of a backup during an epoch from which a particular virtual file system representation can be generated. The backup capture engine 220 can also generate and store markers and other metadata within the local storage 204 providing information about the data items stored in the delta store 214, these markers can then be used when generating each particular virtual file system representation from the delta store 214. The backup capture engine 220 can also store identified data to the external storage device 232 during particular backup operations. The backup capture engine 220 can track multiple local backups stored in the local storage 204 as well as backups stored on external storage devices (e.g., external storage device 232).

The backup component 117 includes a backup restoration engine 222 to restore particular data from one or more backups, both remotely stored and locally stored. In some implementations, the backup restoration engine 222 provides a user interface (e.g., a graphical user interface) where a user can select the item(s) to be restored.

The search component 118 can search directly within the one or more applications 228 for current versions of files or other items. In addition, the search component 118 can search earlier versions of the files and other items using the backup component 117. For example, the search component 118 can provide a search interface within a backup user interface that allows searches of earlier versions of the files or other items. In addition, the search component 118 can provide a search interface within a user interface (e.g., a desktop user interface) that allows searches of the current version of the files or other items.

For example, the search component 118 can be used to initiate a search to find a particular item or element, for example, an image file. If this search finds the sought item, and if the item meets the user's expectations, there may be no need to do any further searching at that time. However, if the search does not find the sought item, or if the item that is found does not meet the user's expectations, the user can choose to perform a search of the backup data. In some implementations, the user activates a backup user interface to search the backup data.

An overlay engine 218 can generate a virtual file system for each respective local backup using the delta store 214. The backup component 117 can use the generated virtual file system to generate a corresponding visual representation of the local backup, for example, within the backup interface. The overlay engine 218 can generate the virtual file system on demand in response to a request, e.g., a request to display a visual representation of a particular backup, using the data in the delta store as well as the data of the current file system.

Figure 3:
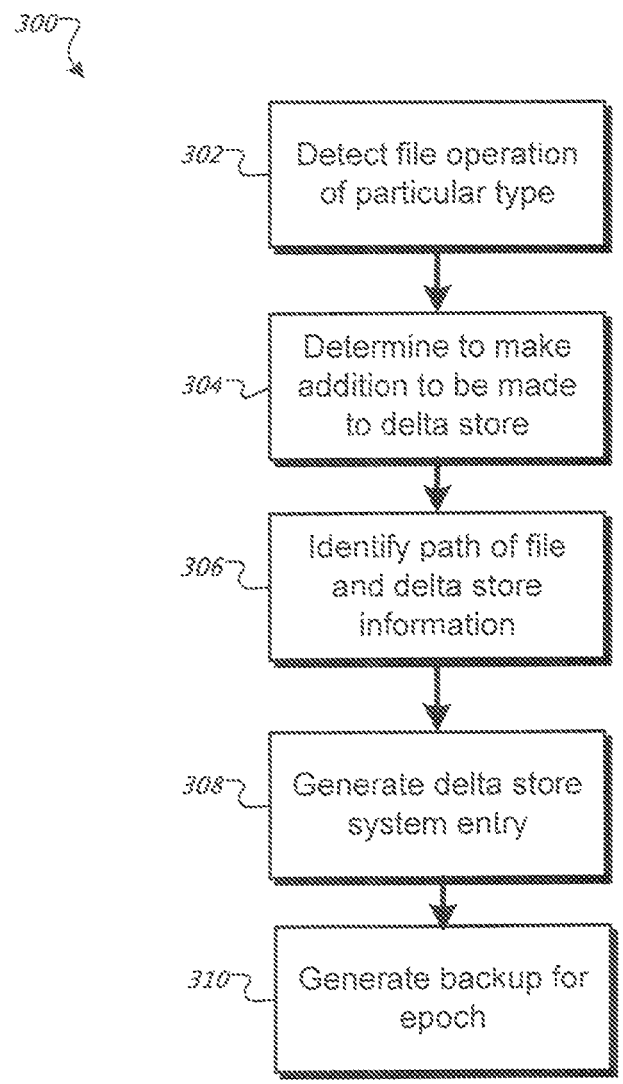
FIG. 3 is a flow diagram of an example process for generating a local backup.

FIG. 3 is a flow diagram of an example process 300 for generating a local backup. The process 300 can be performed by a system including one or more computing devices, for example, the computing device 102 of FIG. 1.

A file operation of a particular type is detected 302. In particular, files can have associated extended attributes indicating that a copy of the file should be stored in a backup prior to particular types of file operations (e.g., the file being modified or deleted). Additionally, the extended attribute can also indicate that a record should be made before a file is moved. That such an extended attribute exists can be indicated in a flag bit of a file inode. The inode is a unique identifier for each file.

Consequently, when a process calls into the kernel to perform a particular file operation, e.g., a write operation to modify the file, the kernel determines whether or not the flag bit is set for the file. If so, the associated extended attribute is read which indicates particular actions to be performed before allowing the write to occur. In particular, the extended attribute can indicate a file handler associated with the backup to be requested so that the file can be processed for the backup (e.g., a copy stored). Once the file handler has performed the requested action, the write operation on the file can be allowed to proceed. Additional details can be found in U.S. patent application Ser. No. 13/350,047, filed on Jan. 13, 2012, and entitled "File System Management," the contents of which are hereby incorporated by reference herein in its entirety.

An addition to a delta store is determined (304). For example, the determination can be based on the detection of the flag bit or the calling of the special file handler by the kernel. Thus, once the file handler is called, the determination can be made to store information in the delta store. In some other implementations, a kernel event can be stored, e.g., in user-space memory. The kernel event can later be used in conjunction with subsequent event information to generate a full record of an event, e.g., a move. This combined information can then be used to generate an entry in the delta store.

In some other implementations, a further determination is made based on whether or not there has already been an addition to the delta store for a particular backup made within a same epoch. For example, if the file has already been modified once during the epoch, the delta store is not modified for any subsequent modifications during the epoch. An epoch can be a period of time between designated backup points defining the contents of a given local backup (e.g., an hour). Thus, the file handler for the backup has been called and no other data associated with the file has been added to the delta store during the present epoch, then a determination can be made to make an addition to the delta store.

The path of the file and delta store information is identified (306). The path of the file is the directory path from a root to the file (e.g., naming directories from a root directory to the location of the file within the hierarchical file system). For example, a file path can be home/dir1/dir2/dir3/example.doc. The delta store information identified depends upon the type of file operation to be performed on the file. In some implementations, the delta store information includes the file data captured prior to an operation on the file being performed. In some other implementation, the delta store information only includes a marker or other metadata describing the file operation and allowing the virtual file system representation to be generated. The marker can indicate, for example, that the entry corresponds to a modification to the file, a deletion of the file, or a move of the file to a different location within the hierarchical file system.

A delta store entry corresponding to the file is generated (308). In particular, the delta store contents for a particular local backup operation can be generated dynamically as items are added during an epoch. The delta store entry includes data for the file, e.g., the file system marker and, in some examples, file data. For example, for files that were being modified, the entry includes the file data prior to the modification. Similarly, for a file to be deleted, the entry includes the file data prior to the deletion. The entry further includes a marker or other metadata indicating the nature of the entry (e.g., a modification, deletion, or move).

Additionally, the delta store entry can identify the portion of the file system corresponding to the path of the file. In particular, the local backup is built in the delta store as needed to store backup data. As a result, in a hierarchical file system, the directories in the path for the file may not exist in the delta store. However, when generating the corresponding virtual file system, fault directories can be generated in order to replicate the hierarchical file system for the path of the file corresponding to the current file system. Each fault file can be a zero data file so that the virtual file system uses less storage space. Thus, for the example file above, each of dir1, dir2, and dir3 can be zero data fault files. Consequently, the fault directories allow for an on-demand directory hierarchy to be generated for the virtual file system.

A backup is created for the present epoch (310). For each epoch time, e.g., an hour, the data added to the delta store is used to define a particular backup or snapshot. Following creation of a given backup, backup data added to the delta store is associated with a next backup.

Additionally, the backup can add additional information to the delta store. In particular, additional entries can be added to the delta store for data items created during the epoch.

For example, if a new file is created during the epoch an entry can be made to the delta store including creating any necessary path directory fault files and including a creation marker. The creation marker indicates that the virtual file system generated from the backup should not include the file and any visual representation of the backup because the file did not exist prior to the backup. Thus, no file data is included in the entry to the delta store. New files being created can be identified using event reporting by applications, for example, though event notifications provided through an Application Programming Interface (API).

In some implementations, certain types of data (e.g., songs, videos, applications) may be stored remotely in an online store or other remote resource, where it can be accessed (e.g., downloaded) repeatedly by a user. In those implementations, it may be desirable to omit data or files from the backup that can be retrieved from the online store or other remote resource. A method of managing backups on a computing device may include receiving a request to backup data on the computing device; determining that at least some of the data to be backed up is retrievable from an online store; and generating a backup of the data that omits the data that is retrievable from the online store.

Figures 4A, 4B, 4C:
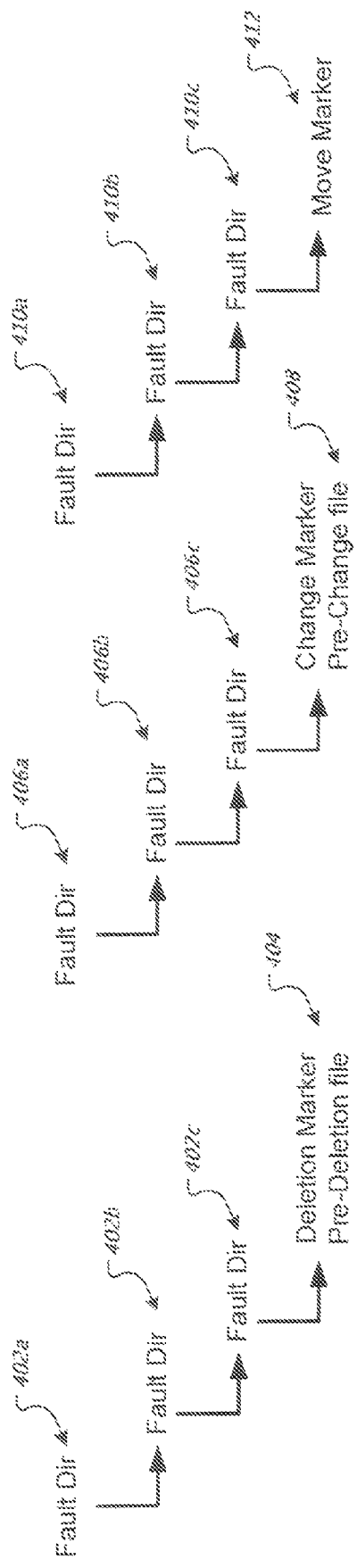
FIGS. 4A-4C are example diagrams of storing data in a virtual file system.

FIGS. 4A-4C are example diagrams showing a file system structure generated for a virtual file system. The virtual file system can be generated, for example, using data stored in the delta store. FIG. 4A shows a portion of a virtual file system generated when a file is being deleted within a particular epoch. In particular, FIG. 4A illustrates three fault directories 402a-c along the file path. The fault directories 402a-c correspond to the structure of the current file system hierarchy and can have zero data.

The entry for the file 404 includes a deletion marker indicating that the file is being deleted and therefore should not be included in later backups. Additionally, the file data for the file prior to deletion is included in the backup so that it can be restored. Thus, when displaying a representation of the file system corresponding to the backup, the file corresponding to the entry will be presented as present in the file system. This is in contrast to entries for created items, which do not include the file data and do not present the newly created items when displaying a representation of the file system in the backup for that epoch (but will appear in representations of later backups unless deleted).

FIG. 4B shows three fault directories 406a-c along the path of the file. The fault directories 406a-c correspond to the structure of the current file system hierarchy, but can have zero data. The entry for the file 408 includes a change marker indicating that the file is being modified. Additionally, the file data for the file prior to modification is included in the backup. Thus, when displaying a representation of the file system corresponding to the backup, the unmodified file will be presented as present in the file system. Additionally, this version of the file can be restored from the locally stored backup.

FIG. 4C shows three fault directories 410a-c along the path of the file. The fault directories 410a-c correspond to the structure of the current file system hierarchy, but can have zero data. The entry for the file 412 includes a move marker indicating that the file is being moved. The move marker can further include a pointer identifying the moved location of the file. The file data, however, is not included since the current file system file has the same data; just the location has been changed.

Figure 5:
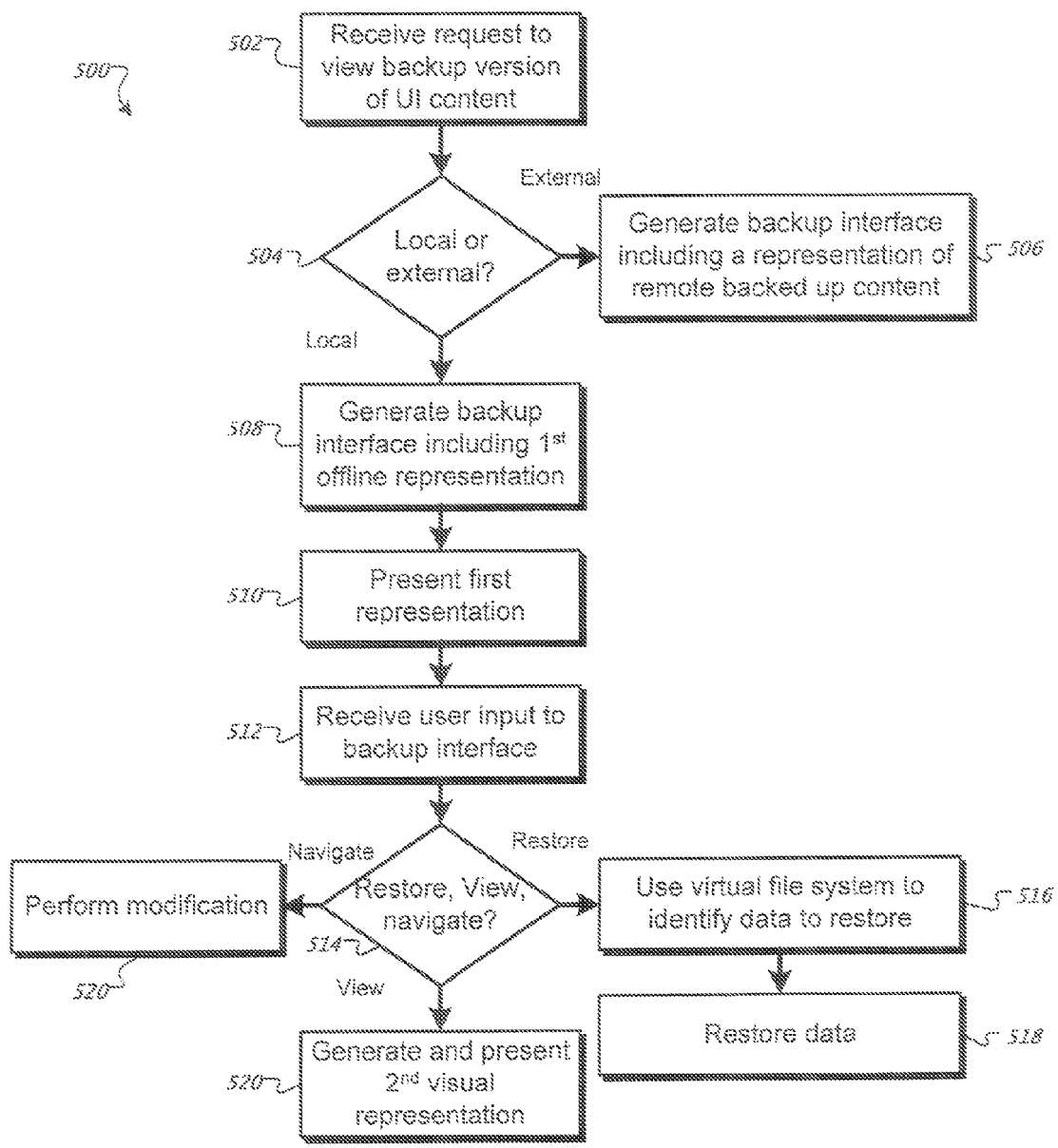
FIG. 5 is a flow diagram of an example process for displaying local backup data.

FIG. 5 is a flow diagram of an example process 500 for displaying local backup data. The process 500 can be performed by a system including one or more computing devices, for example, the computing device 102 of FIG. 1.

A request is received to view backup content (502). In some implementations, a user request to view backup content is submitted from a user interface window of the current file system (e.g., a window displaying folders or files of the current file system). For example, the user can submit the request in order to restore an earlier version of a file or restore a deleted file that is no longer present in the current file system. The window displaying content from the current file system can include an icon or menu item to enter a backup interface that can be selected by the user.

A determination is made as to whether local backups are the only available or whether backups stored on external storage device are available (504). For example, when the user's device is disconnected from an external storage device for storing backup data, only local backups may be available. Alternatively, when the user's device is connected to the external storage device, externally stored backup data is available.

When externally stored backups are available, a backup interface is generated including one or more representations of the backup content from the external storage backups (506). In some implementations, the backup interface provides one or more visual representations of the same file system window previously presented to the user. However, the content in the visual representations of the file system window correspond to the content present in the particular backup. For example, the window can display files or folders present in the backup of the file system.

In some implementations, the user can interact with the visual representations to select particular data items (e.g., for restoration) or to navigate the file system hierarchy (e.g., opening a folder to view the contents within another visual representation. A different visual representation can be presented for each backup, for example, one at a time or as part of a stack of visual representations to which the user can navigate. In some implementations, the backups locally stored and the externally stored local backups are both presented in the backup interface. The different types of backups can be differentiated in the backup interface, for example, using different visual cues (e.g., different colors or different visual effects such as badging) to distinguish the locally stored and externally stored backup data.

When only local backups are available, a first visual representation of a first local backup is generated (508). The first visual representation is generated using the virtual file system generated using data of the most recent local backup as well as the current file system data. Generating the first visual representation is described in greater detail below with respect to FIG. 6.

The first visual representation is presented, for example, within a backup interface (510). The first visual representation can be presented in a similar manner to the visual representations of externally stored backups. Thus, the first visual representation can present a file system window corresponding to the file system window previously presented to the user but with content corresponding to the particular local backup. The visual representation is tied to the underlying data of the virtual file system.

A user input is received in the backup interface (512). In particular, the user can interact with the visual representation, for example, to navigate within the file system of the backup as well as to select one or more displayed items for restoration. The user can also provide an input to view another visual representation corresponding to an earlier local backup. For example, a particular file the user is looking for may not be in the most recent local backup. Therefore, the user can look in an earlier backup.

A determination is made as to whether the input is a restore input, a request to view a visual representation of an earlier local backup, or a navigational input (514). If the input is a restore input, the virtual file system is used to identify corresponding data in the delta store to restore (516). The restore input can be received, for example, according to a user selection of one or more data items in the first visual representation. For example, the user can select one or more files for restoration. The data within the virtual file system corresponding to the selected file is identified. The data item is then restored to the current file system (518). Restoring can include replacing a current version of the data item with the restored version. Alternatively, restoring the data item can include copying the restored data item to the current file system such that both the existing version of the data item and the restored version are retained.

If the input is a navigation input, a corresponding modification is performed (520). For example, the navigation input can be to display a different level of the file system hierarchy of the backup (e.g., by opening a folder). The visual representation can be modified to present the selected portion of the file system. In another example, the navigation input can be to exit the backup interface. The backup interface can be dismissed (with or without animation) and the user returned to the same file system window from which the backup interface was invoked.

If the input is to view a visual representation of an earlier local backup, a second visual representation corresponding to the requested earlier local backup is generated and presented (520).

Figure 6:
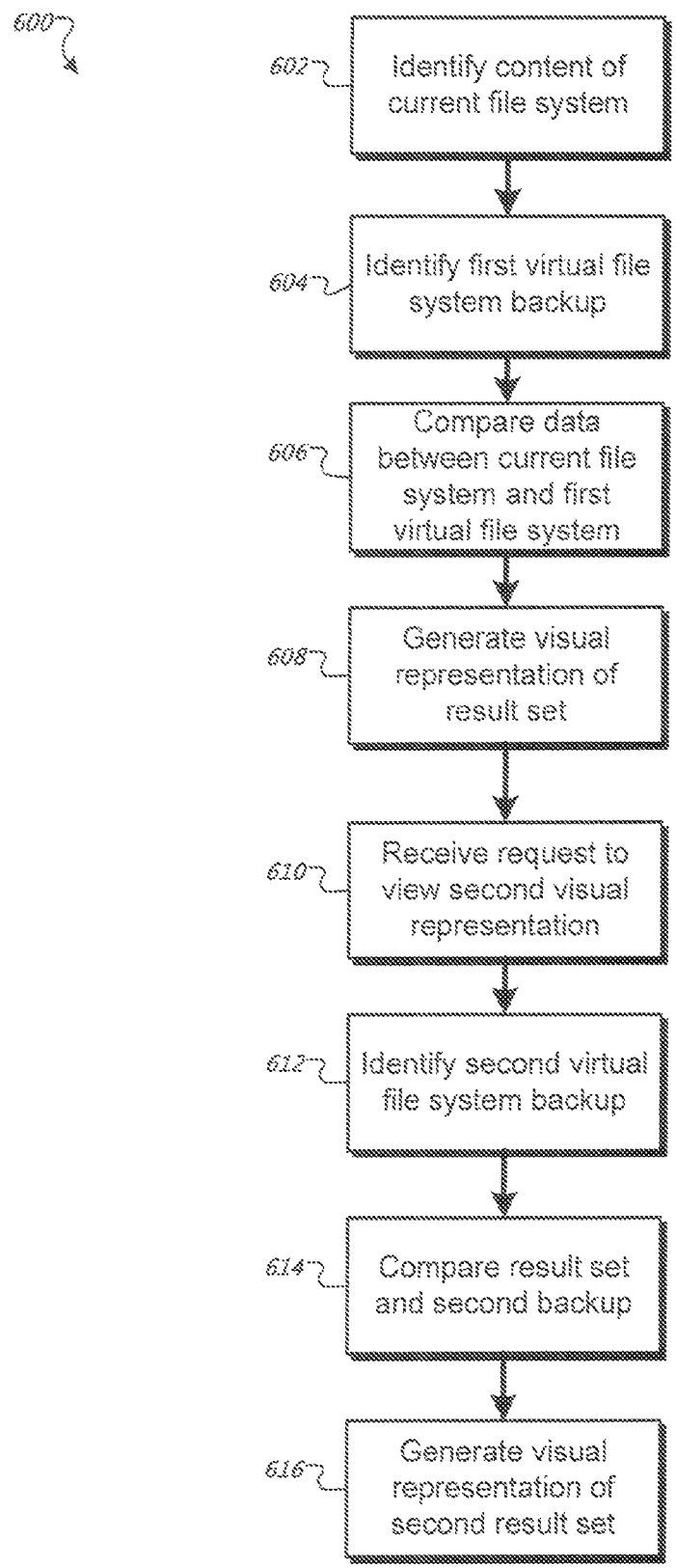
FIG. 6 is a flow diagram of an example process for generating a visual representation of a particular local snapshot.

FIG. 6 is a flow diagram of an example process 600 for generating a visual representation of a particular local backup. The process 600 can be performed by a system including one or more computing devices, for example, the computing device 102 of FIG. 1.

In response to the request to display a visual representation of the local backup, the contents of the current file system are identified (602). Data from a first virtual file system of a local backup is also identified (604). In some implementations, the first virtual file system data of the most recent local backup is identified. The first virtual file system data can be generated on the fly, e.g., in response to a request for a display of a particular local backup. The first virtual file system can be generated, for example, using data corresponding to the local backup located in a particular delta store of a local storage device. In some alternative implementations, a virtual file system is generated for each local backup using the delta store and stored, e.g., in the local storage device.

The current file system data is compared to the first virtual file system data (606). In some implementations, one or more set operations are performed to identify differences between the two file systems. These differences can indicate content to be added or removed from the visual representation of the backup relative to the current file system. For example, if the current file system does not include a particular file while the virtual file system does include a file indicating that the file was deleted, then the file should be shown in any generated visual representation. Similarly, if a file exists in the current file system while a creation marker is present in the virtual file system, then the file should not be presented (the creation marker causes the file to be subtracted in the comparison). However, if the file exists in the current file system and the virtual file system does not include a marker for that file, then the file should be presented as the current file is consistent with the backup.

Whether to add or remove a particular data item such as a file as a result of the comparison depends on the particular virtual file system markers. Thus, starting with the full file system from the current file system, data items are added or subtracted based on the markers in the virtual file system. This allows for the generation of visual representations of the full backup file system using a reduced representation provided by the virtual file system.

A visual representation of the backup is generated from the result set of the comparison (608). The identified file system hierarchy of the result set is used to generate the visual representation of that file system hierarchy, in particular, the portion corresponding to the file system window that was previously being presented to the user prior to requesting the backup. Additional visual representations of different portions of the backup can be generated from the result set as the user navigates the visual representation.

A request is received to view a second visual representation corresponding to an earlier backup (610). In response to the request, a second virtual file system corresponding to the earlier backup is identified (612). In particular, the second virtual file system can correspond to the next earlier backup relative to the first virtual file system and can be generated in response to the request. A comparison is made between the previous result set (e.g., between the current and first virtual file system) and the second virtual file system (614). For example, the comparison can include one or more set operations as described above. A second visual representation is generated from the second result set.

In some implementations, the virtual file system representations are cumulative such that in order to identify the content to display in a visual representation of a given backup all virtual file system representations between the current file system and the backup content to be displayed are traversed. Thus, if the backup content of a fifth virtual file system corresponding to a fifth backup from the current file system is to be displayed, the fifth virtual file system is compared with a result set corresponding to a comparison of the prior result sets for each step from the current file system (e.g., between the current file system and the first virtual file system, between the first result set and the second virtual file system, etc.). While increasing processing for displaying older backups, each virtual file system is more compact and can fully reconstruct the file system at that point in time.

Figure 7:
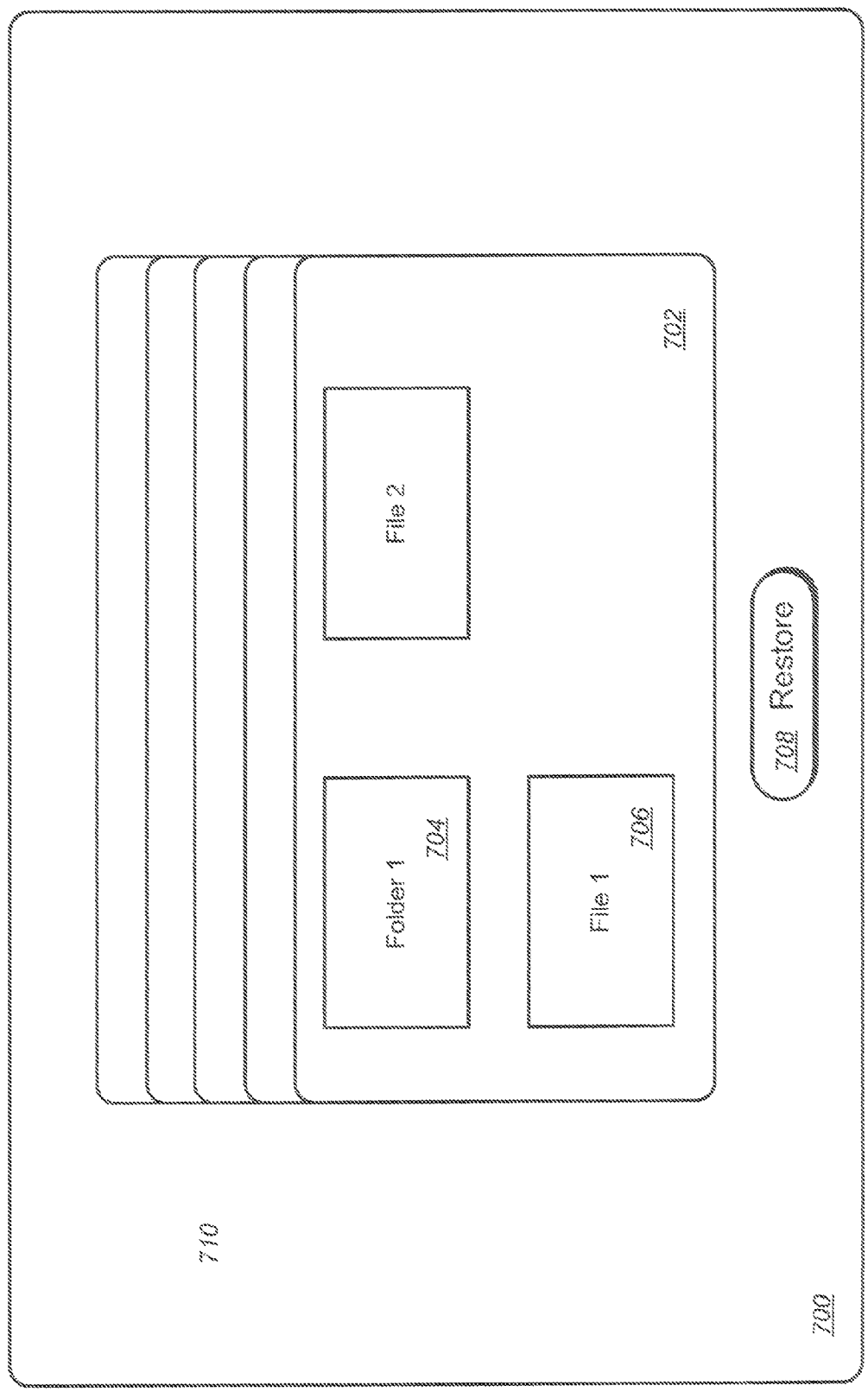
FIG. 7 is an example backup user interface.

FIG. 7 is an example backup user interface 700. The backup interface can be generated, for example, within a desktop user interface of a user's computing device in response to a user request to view backup data. In some implementations, the user request is initiated from a user interface window displaying particular current file system content (e.g., a particular directory of the file system). In some implementations, the backup interface is a window presented within the desktop user interface. In some other implementations, the backup interface is presented as an overlay to the desktop user interface such that only the backup user interface is visible.

The backup user interface 700 includes a first visual representation 702 of backup data. The first visual representation 702 can correspond to a visual representation of the same user interface window (e.g., as previously viewed by the user before initiating the backup interface), but displaying content corresponding to the backup as defined by the virtual file system. Thus, the first visual representation 702 presents the user interface window as it appeared at the time of the backup.

The first visual representation 702 is not an image; however, but an interactive representation from which the user can navigate the file system of the backup (e.g., by opening file 704 to view the corresponding contents) as well as select one or more items (e.g., item 706) for restoration, for example, by then selecting a restore button 708 or by clicking or touching a visual representation (e.g., double clicking with mouse or double tap with finger or stylus). Additional visual representations corresponding to other backups can be presented (e.g., as placeholders or actual backup visual representation). For example, a stack 710 can be used to represent additional backup visual representations in chronological order. In some implementations, the contents of each visual representation in the stack are generated upon selection, or are navigated to, by the user.

In some implementations, to speed up browsing or navigating of the backup user interface 700 by the user, backup visual representations (e.g., folders 704, 706) can be generated by overlay engine 218 from file system metadata that is cached locally in memory of the computing device or on locally attached storage. File system metadata can include an icon, image or other graphic, the name of the file and the size of the file. Other metadata may also be stored for generating the visual representation. When a user requests to restore the item (e.g., by double clicking on the visual representation), backup restoration engine 222 establishes a connection to the physical storage location of the item (e.g., local hard drive, external hard drive, network storage device, flash drive) and manages the restoration of the item to the computing device.

Figure 8:
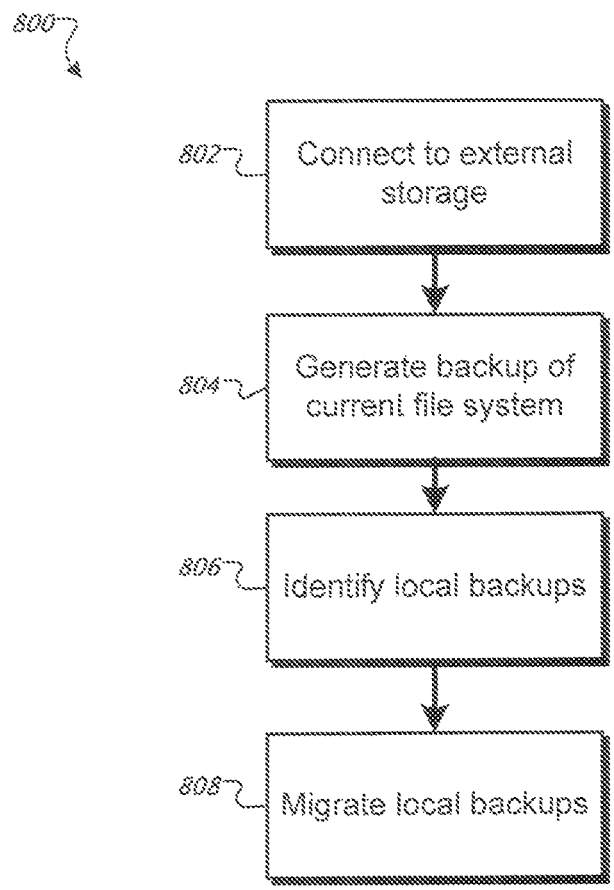
FIG. 8 is a flow diagram of an example process for migrating local backups to remote backups.

FIG. 8 is a flow diagram of an example process 800 for migrating local backups to remote backups. The process 800 can be performed by a system including one or more computing devices, for example, the computing device 102 of FIG. 1. For example, when a user reconnects to a remote storage device used for storing backups, the particular local backups that were generated for local storage while the remote storage device was disconnected can be migrated to backups for the remote storage device.

A connection is made with an external storage device (802). For example, the user of a portable computing device can reconnect with an external storage location used for backups (e.g., an external storage disk, a server, a cloud storage location on a network, etc.).

A backup is generated of the current file system and stored on the external storage device (804). Thus, a backup is generated corresponding to the current file system existing on the user device (e.g., generated based on all changes between the previous backup on the external storage device and the current data).

Local backups for migration are identified (806). Since the current data has already been backed up, for each local backup there is already an older and a newer backup on the external storage device. For example, consider a scenario where the next newest backup on the remote storage device generated three hours ago is backup-3 and the newest backup just taken is backup-now. Additionally, there are two locally stored backups backup-1 and backup-2, where backup-1 was generated 1 hour ago and backup-2 was generated two hours ago. In some implementations, there may still be local backups stored that are older than the next externally stored backup (e.g., older than three hours in the example). These can be ignored since they are older than the externally stored backup.

Identified local backups are migrated to the external storage (810). In particular, in some implementations, the local backups are migrated from newest to oldest (e.g., first backup-1 and then backup-2). To migrate the local backups, the virtual file system entries are examined. For example, when looking at a particular folder, a determination needs to be made as to whether that folder has changed or whether anything within that folder is different than what was in either the latest externally stored backup or the previously stored external backup (e.g., backup-3 and backup-now). Whenever changed information is added to the virtual file system of a given backup, a marker or extended attribute is added to the virtual file system as well. This marker indicates that the item present in the virtual file system is a copy in the delta store of the local storage, not the original. Thus, this is likely an item that needs to be migrated to the external storage. These items are then copied and linked to identical content in other externally stored backups (e.g., using hard links). In particular, when migrating backup-1, items that are identified as the same as what is in the current disk (backup-now) (e.g., there is no corresponding virtual file system entry for unchanged items and therefore no marker) are linked to the matching path on the current backup (backup-now).

Items that are likely to be different based on the existence of the marker are compared directly to the corresponding item in the current backup (backup-now) and linked to the corresponding path in backup-now if they are identical, and then compared to the prior external backup (backup-3) and linked to the corresponding path there if identical. If neither matches, the content of the data is copied to the backup-1 being created (e.g., the data does not exist on any other backup). The process continues sequentially for each local backup. However, going back in time the comparison is not to the current backup but to the most closely generated external backup following the one being migrated. For example, after backup-1 has been migrated, when migrating backup-2, the comparison is between backup-3 and backup-1 instead of backup-3 and backup-now.

Figure 9:
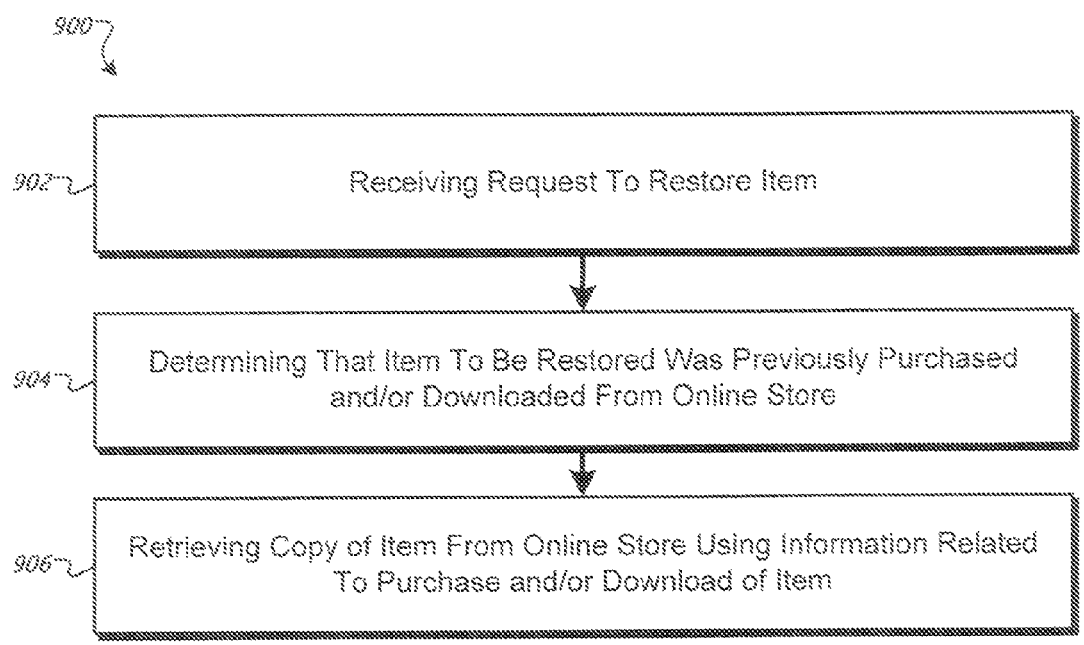
FIG. 9 is a flow diagram of an example process for restoring items from an online store to a computing device.

FIG. 9 is a flow diagram of an example process 900 for restoring items from an online store to a computing device. Process 900 can be implemented by an operating system kernel.

As part of a backup process (either to local disk, external storage device or network storage), it is desirable to reduce the size of the backup to save space on the storage device or to send less data to a network storage device during a backup operation. In some cases, an item to be backed up or restored may have been purchased and/or downloaded from an online store. Some examples of an online store are iTunes Store® or App Store$^{SM}$, both operated by Apple Inc. of Cupertino, Calif., USA.

Similar to other files visually represented in a backup user interface, an item purchased and/or downloaded from an online store can have a visual representation in a backup user interface. The visual representation can be, for example, a folder with an icon, image or other graphic identifying the item, as described in reference to FIG. 7. From the perspective of the user, the online store item appears to be part of the backup even though the actual data is stored in a database operated by the online store and not locally on the computing device. The representation can be generated from metadata stored locally in memory on the computing device or on a local storage device, which can include an icon, image or graphic, the name of the item and its size. Other metadata can also be used to generate the visual representation. In some implementations, the metadata can be stored in the delta store or the current file system and used by overlay engine 218 to generate the visual representation in backup user interface 700, as described in reference to FIG. 2 and FIGS. 5-7. The online store item can be restored using process 900 as described below.

In some implementations, process 900 can begin by receiving a request to restore an item (902). The request can be in the form of a user selecting a visual representation of the item presented in a backup user interface. For example, a user may click or touch (e.g., double click or double tap) a folder displayed in the backup user interface 700 representing the online store item to be restored.

In response to the request, process 900 can continue by determining that the item to be restored was previously purchased and/or downloaded from an online store (904). The item can be a software application, audio file (e.g., a song), video file, digital image, ringtone, digital book or any other digital media. In some implementations, process 900 can determine if a receipt file exists for the item. The receipt file can include information related to the purchase of the item from the online store, including but not limited to a bundle ID identifying the item or items downloaded, a store ID identifying a server in the online store that can access a stored version of the item, a version number of the downloaded item, a user ID, a date of download and any other information associated with the purchase and/or download that is necessary to establish communication with the online store and to restore the item from the online store database to the computing device during a restore operation.

Process 900 can continue by retrieving a copy of the item from the online store using the information related to the purchase and/or download of the item (906). For example, information contained in the receipt file (e.g., server ID) can be used to establish a connection with a server of the online store that can access the item (e.g., access a content database) and to download a copy of the item to the computing device during the restore operation.

In some implementations, the restore operation is implemented by a request to an operating system kernel. The file data can be identified according to an inode or other catalog record for the file. The inode is a unique identifier for the file that is this indexed in a table of inodes to file information, including the location of blocks of data in which the file is stored, timestamps, last accessed time, owner of the file, permissions, size and/or file creation time. The operating system kernel can load the inode file information into memory from disk.

The inode can be associated with one or more flag bits. A particular flag bit can indicate that special handling of the file should be performed. When the flag bit is set, the kernel can read an extended attribute associated with the file. The extended attribute can be an additional data structure associated with the file that describes the special handling to be formed for the restore operation. In some implementations, the extended attribute can provide file system metadata (e.g., icon, file name and size) needed to generate a visual representation of the file in a backup user interface. The extended attribute can indicate that the file is a data-less file and that the corresponding file data needs to be retrieved from an online store or some other external storage device before the kernel can perform the restore operation. For example, the extended attribute may indicate that a receipt file exists for the file and the location of that receipt file. File system management of data-less files is described in co-pending U.S. patent Ser.. No. 13/350,047, for "File System Management," filed Jan. 13, 2012, which patent application is incorporated by reference herein in its entirety.

Figure 10:
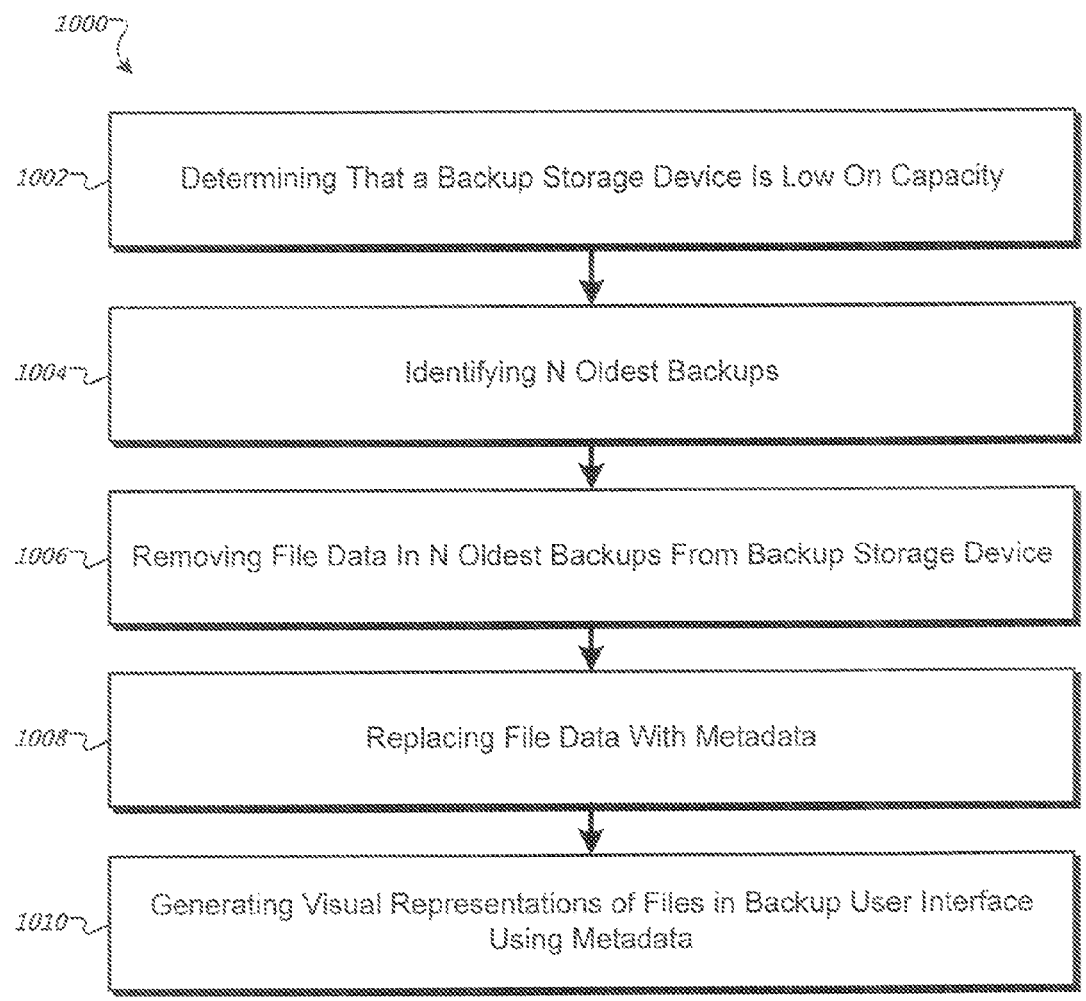
FIG. 10 is a flow diagram of an example process for managing backups to free up storage space.

FIG. 10 is a flow diagram of an example process 1000 for managing backups to free up storage space. Process 1000 can be implemented by an operating system kernel.

In some implementations, process 1000 can begin by determining that a backup storage device is low on storage capacity (1002). In some implementations, an operating system kernel or driver detects the low storage capacity condition. Process 1000 can continue by identifying the N oldest backups stored on the backup storage device, where N is a positive integer greater than one (1004). Process 1000 can continue by removing data of items in the N oldest backups from the backup storage device (1006). Process 1000 can continue by replacing the data with metadata (1008). Process 1000 can continue by generating visual representations of items in one or more backup user interfaces using the metadata (1010).

FIGS. 11A-11D are screen shots illustrating a virtual file system and the use of sparse file system metadata to generate visual representations of files in a backup user interface. The virtual file system can be generated by, for example, the backup component 117 and the operating system kernel 224, as described in reference to FIG. 2.

Figure 11A:
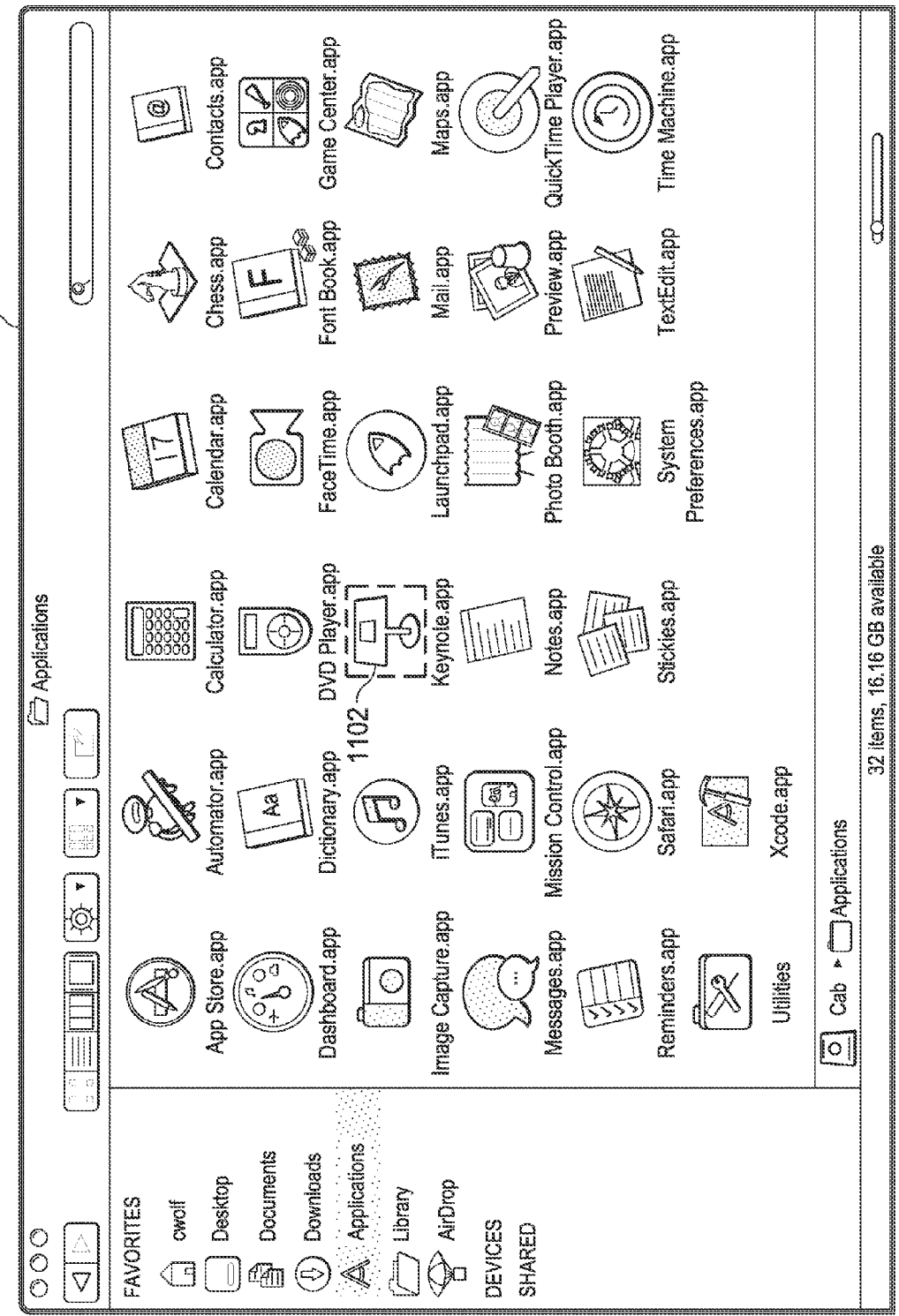

FIG. 11A is an example user interface 1100 displaying a number of icons representing applications in an applications folder. The icon 1102 representing a Keynote application will be used as an example. User interface 1100 can be a file system user interface that can be presented to a user of a computing device. The user interface 1100 can be used to select and open applications.

Figure 11B:
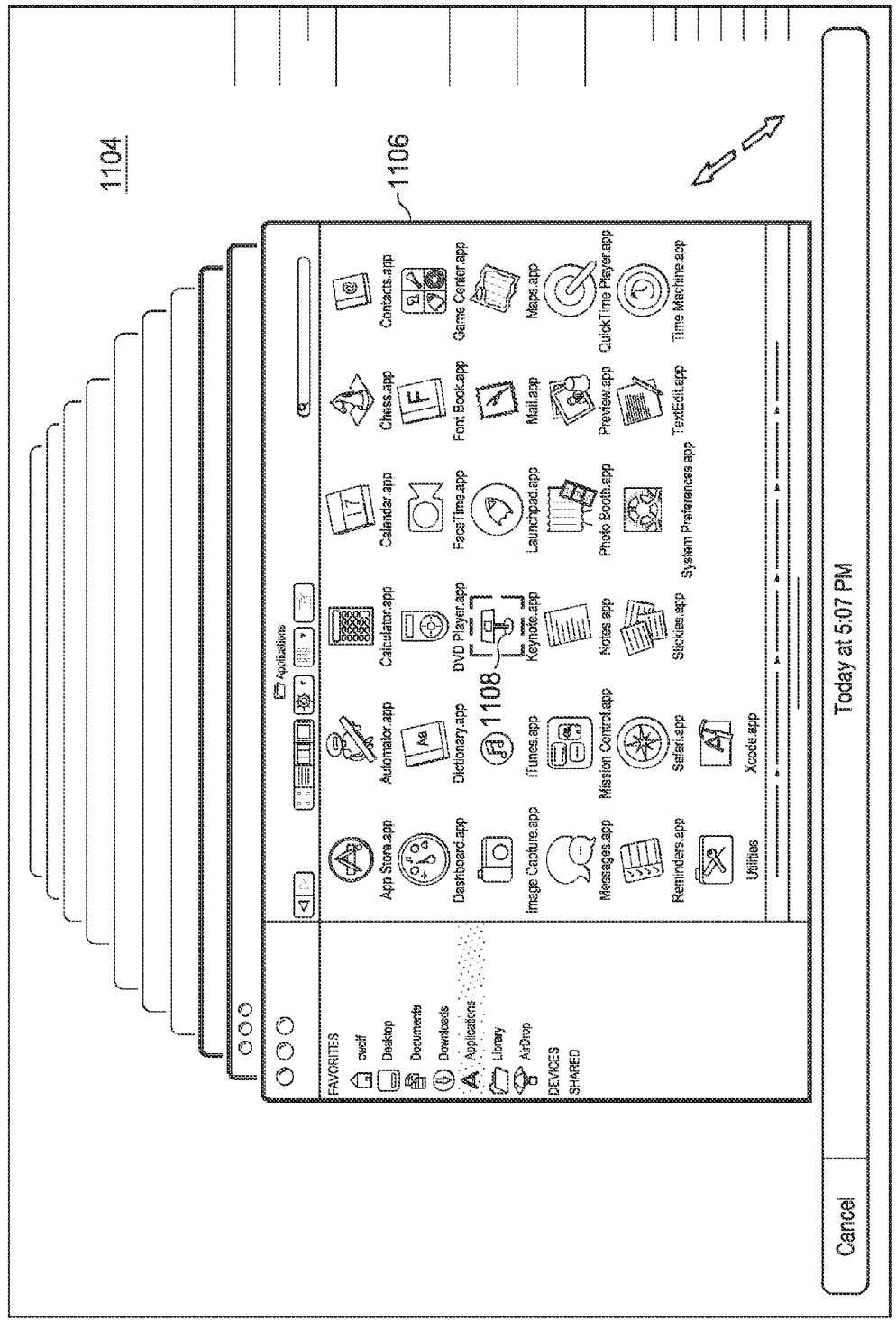

FIG. 11B is an example user interface 1104 generated by a backup application running on the computing device. In some implementations, a number of backup user interfaces are displayed in the user interface 1104, in a row that extends into the user interface 1104 (along the z or depth direction). Each backup user interface represents a snapshot of a backup at a particular time in the past. The user can select a backup user interface in user interface 1104. The selected backup user interface can be navigated by the user. The icon 1108 representing the Keynote application is presented in a latest backup user interface 1106, which is presented in the front. The backup user interface 1106 creates the illusion for the user that the Keynote application data is stored on the computing device in the latest backup.

FIG. 11C is an example user interface 1110 illustrating a data-less placeholder file 1112 named "Keynote.appdownload" generated from file system metadata, including an icon and file name.

Figure 11D:
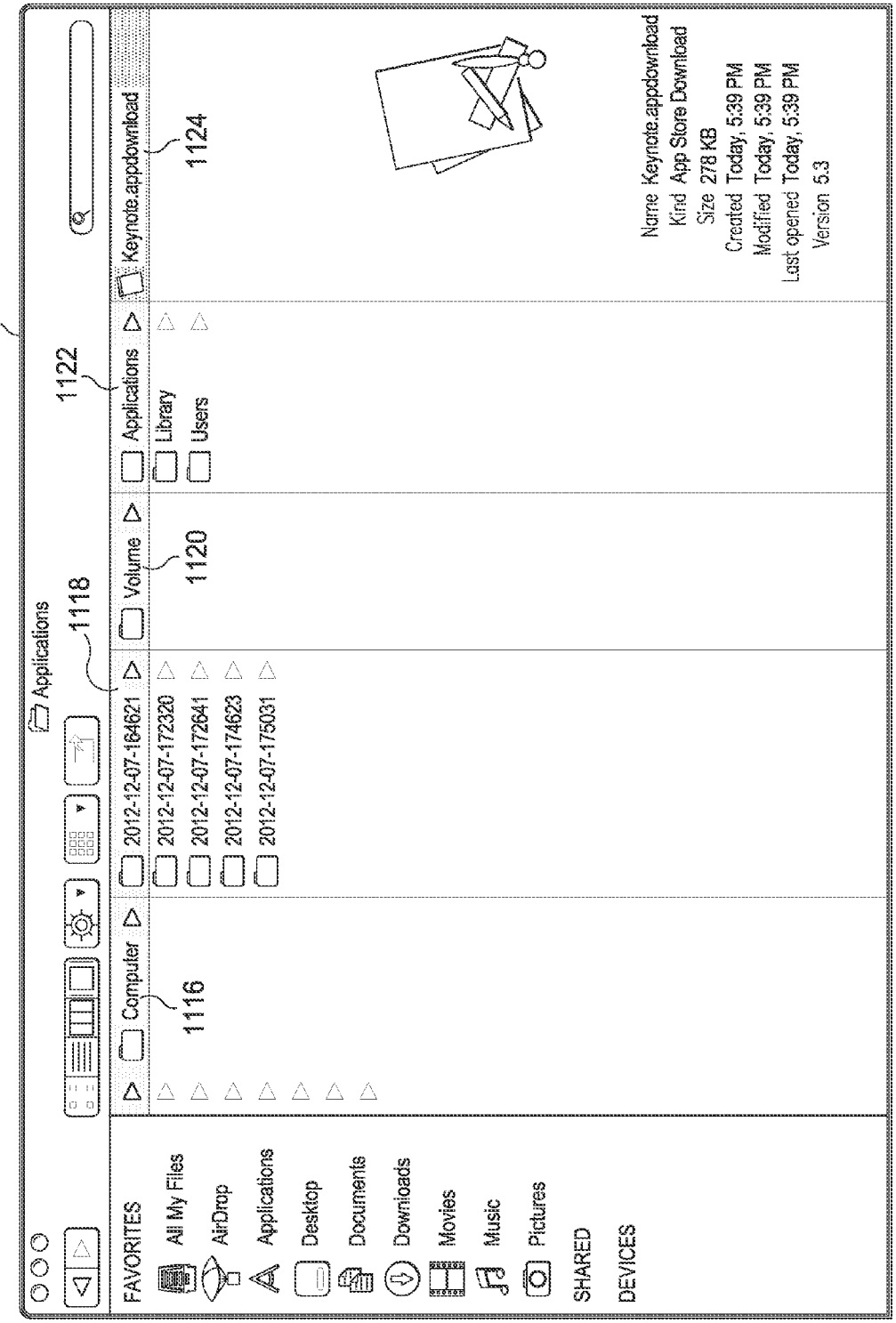

FIG. 11D is an example user interface 1114 illustrating the sparse nature of the directory hierarchy of a virtual file system. In this example, metadata is used to generate visual representations 1116, 1118, 1120, 1122 and 1124. Icon 1116 is a visual representation of a folder named "Computer." Icon 1118 is a visual representation of a backup folder named "2012-12-07-164621." Icon 1120 is a visual representation of a folder named "Volume." Icon 1122 is a visual representation of a folder named "Applications." Icon 1124 is a visual representation of the placeholder file named Keynote.appdownload. These folders represent a file system hierarchy and a path to Keynote.appdownload. All of these folders and files are data-less and are generated using sparse file system metadata, such as icons and names.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single embodiment. Conversely, various features that are described in the context of a single embodiment can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of restoring backup data on a computing device, the method comprising:
   generating a backup of the computing device at a first time, wherein the backup comprises one or more copies of one or more items stored on the computing device;
   subsequent to generating the backup, displaying a backup user interface on a display of the computing device, the backup user interface including a visual representation of a file system of the computing device according to the first time, the visual representation of the file system including a first icon representing a first item stored within the backup and a second icon representing a second item not stored within the backup;
   receiving, via the backup user interface, a user request to restore the second item from the backup;
   determining, at the computing device, that the second item was previously purchased or downloaded from an online store distinct from the backup; and
   retrieving, using the computing device, a copy of the second item from the online store using information related to the purchase or download of the second item,
   where the method is performed by one or more hardware processors.

2. The method of claim 1, where determining that the second item was previously purchased or downloaded from an online store further comprises:
   associating a receipt file with the second item, where the receipt file was generated during the purchase or download of the second item.

3. The method of claim 2, where retrieving the copy of the second item from the online store using information related to the purchase or download of the second item, further comprises:
   using information contained in the receipt file to establish a connection with a server in the online store and to download the copy of the second item to the computing device.

4. The method of claim 1, wherein the backup is remote from the computing device.

5. The method of claim 1, wherein receiving the user request to restore the second item from the backup comprises receiving an indication that a user selected the second icon in the visual representation of the file system.

6. The method of claim 1, wherein the online store is remote from the computing device.

7. The method of claim 6, wherein the online store and the computing device are communicatively coupled using a communications network.

8. A method of managing backups on a computing device, the method comprising:
  determining that a backup storage device is low on storage capacity;
  identifying N oldest backups, where N is a positive integer greater or equal to one;
  removing items in the N oldest backups from the backup storage device;
  replacing the removed items with sparse file system metadata, wherein the sparse file system metadata comprises an icon and a name for each removed item; and
  generating visual representations of the removed items in one or more backup user interfaces using the metadata, where the method is performed by one or more hardware processors.

9. The method of claim 8, where generating visual representations of the removed items in the one or more backup user interfaces using the metadata, includes performing a set operation between items of a current file system and items of a virtual file system or a set operation between items of two or more virtual file systems, to determine contents of the visual representations.

10. The method of claim 9, wherein the contents of the visual representations are determined by identifying items to be added to the visual representations relative to a current state of a file system.

11. The method of claim 9, wherein the contents of the visual representations are determined by identifying items to be removed from the visual representations relative to a current state of a file system.

12. A system for restoring backup data on a computing device, the system comprising:
  one or more processors;
  memory coupled to the one or more processors and configured to store instructions, which, when executed by the one or more processors, causes the one or more processors to perform operations comprising:
    generating a backup of the computing device at a first time;
    subsequent to generating the backup, displaying a backup user interface on a display of the computing device, the backup user interface including a visual representation of a file system of the computing device according to the first time, the visual representation of the file system including a first icon representing a first item stored within the backup and a second icon representing a second item not stored within the backup;
    receiving, via the backup user interface, a user request to restore the second item from the backup;
    determining, at the computing device, that the second item was previously purchased or downloaded from an online store distinct from the backup; and
    retrieving, using the computing device, a copy of the second item from the online store using information related to the purchase or download of the second item.

13. The system of claim 12, where determining that the second item was previously purchased or downloaded from an online store further comprises:
  associating a receipt file with the second item, where the receipt file was generated during the purchase or download of the second item.

14. The system of claim 13, where retrieving the copy of the second item from the online store using information related to the purchase or download of the second item, further comprises:
  using information contained in the receipt file to establish a connection with a server in the online store and to download the copy of the second item to the computing device.

15. The system of claim 12, wherein the backup is remote from the computing device.

16. The system of claim 12, wherein receiving the user request to restore the second item from the backup comprises receiving an indication that a user selected the second icon in the visual representation of the file system.

17. The system of claim 12, wherein the online store is remote from the computing device.

18. The system of claim 17, wherein the online store and the computing device are communicatively coupled using a communications network.

19. A system for managing backups on a computing device, the system comprising:
  one or more processors;
  memory coupled to the one or more processors and configured to store instructions, which, when executed by the one or more processors, causes the one or more processors to perform operations comprising:
    determining that a backup storage device is low on storage capacity;
    identifying N oldest backups, where N is a positive integer greater or equal to one;
    removing items in the N oldest backups from the backup storage device;
    replacing the removed items with sparse file system metadata, wherein the sparse file system metadata comprises an icon and a name for each removed item; and
    generating visual representations of the removed items in one or more backup user interfaces using the metadata.

20. The system of claim 19, where generating visual representations of the removed items in the one or more backup user interfaces using the metadata, includes performing a set operation between items of a current file system and items of a virtual file system or a set operation between items of two or more virtual file systems, to determine contents of the visual representations.

21. The system of claim 19, wherein the contents of the visual representations are determined by identifying items to be added to the visual representations relative to a current state of a file system.

22. The system of claim 19, wherein the contents of the visual representations are determined by identifying items to be removed from the visual representations relative to a current state of a file system.

* * * * *